United States Patent [19]
Kurcz

[11] 3,944,712
[45] Mar. 16, 1976

[54] ZINC DUST-COATED STEEL LIGATURES

[75] Inventor: Joseph F. Kurcz, Summit, Ill.

[73] Assignee: Signode Corporation, Glenview, Ill.

[22] Filed: Aug. 10, 1973

[21] Appl. No.: 387,328

[52] U.S. Cl. .................. 428/418; 29/195; 106/1; 260/37 EP; 260/37 M; 428/460; 428/524; 427/372; 427/383

[51] Int. Cl.² ............................................ C23C 1/00

[58] Field of Search ......... 117/131, 71 R, 71 M, 50, 117/22, 132 BE, 132 BF, 161 L; 106/1; 260/38, 37 EP, 37 M; 427/372, 421, 433, 436, 383, 386; 29/195 P; 428/418, 460, 524, 379

[56] References Cited
UNITED STATES PATENTS

| | | | |
|---|---|---|---|
| 2,699,413 | 1/1955 | Seagren et al. | 117/132 BE |
| 3,085,900 | 4/1963 | Lopata | 117/131 |
| 3,123,582 | 3/1964 | Tryzna | 117/132 BE |
| 3,242,001 | 3/1966 | Lucas | 117/89 |
| 3,288,746 | 9/1969 | Kluth | 260/37 EP |
| 3,356,624 | 12/1967 | Neal et al. | 260/37 EP |
| 3,408,318 | 10/1968 | Madison | 260/37 EP |
| 3,464,854 | 9/1969 | Bolger | 260/37 EP |
| 3,829,395 | 8/1974 | Goodell | 260/37 EP |

*Primary Examiner*—Ralph S. Kendall
*Assistant Examiner*—Edith R. Buffalow

[57] ABSTRACT

Steel ligatures are provided having coated thereon a thin film of a resin composition containing zinc particles. The resin composition comprises a mixture of an epoxy resin and a phenolic resin, and the coating may be cured, or substantially uncured, as desired.

11 Claims, No Drawings

ZINC DUST-COATED STEEL LIGATURES

BACKGROUND OF THE INVENTION

This invention relates to steel ligatures, and particularly to steel strapping, coated with zinc particles, or dust, the particles being bonded to each other and to the surface of the strapping with a resinous composition comprising a mixture of an epoxy resin and a phenolic resin. The invention also relates to a method for applying such coatings to steel ligatures.

The coating of steel to provide protection against corrosion caused by exposure to the elements has been known for many years. Organic resinous films provide protection, but weather resistance is limited, particularly when the film is thin. Pigmentation of the organic resinous film is somewhat beneficial, but weather resistance is still inadequate.

The incorporation of zinc dust into organic resinous films to enhance weather resistance is known, but these coatings, when heavily loaded with zinc, generally lack the flexibility, toughness and abrasion resistance essential to use on steel strapping.

In Lucas U.S. Pat. No. 3,242,001 there is disclosed a steel strapping coated with a heavily loaded zinc dust-containing organic resinous material of particular composition which is durable and flexible and has weather resistance substantially superior to that of prior steel strapping and adequate for most uses. Specifically, the Lucas patent teaches steel strapping coated with a thin and flexible film comprising 80 to 96 parts by weight of finely divided zinc particles, and 4 to 20 parts by weight of a resinous composition comprising a heat-cured oily butadiene polymer having a molecular weight from about 1,000 to about 30,000 and a high molecular weight linear condensation product of epichlorohydrin and bisphenol A having an average molecular weight of approximately 100,000.

While the coated steel strapping of the Lucas invention provides excellent corrosion protection for most uses, it is not satisfactory for uses in which the strapping is to be exposed to severe weathering conditions over an extended period. Some makers of bricks, for example, use steel strapping to make bundles of bricks and then store the bundles out of doors, exposed to the weather, for weeks or months until they are sold and used. Failure of the protective coating under these severe conditions causes discoloration of the bricks by the rusting of the strapping, making the bricks unsatisfactory for many purposes. Failure of the protective coating can also lead ultimately to the weakening and failure of the strapping itself to perform its function.

The use of steel strapping under conditions which expose it to acid is also a severe use. Some fabricators of aluminum ingots, for example, wrap steel strapping around bundles of ingots and then immerse the bundles into an acid pickling bath while suspending them by the strapping. Packets of acid may remain in the narrow spaces between the strapping and the ingot surfaces after the ingots are withdrawn from the acid bath and the prolonged exposure of the coated strapping to this acid may weaken the strapping and ultimately cause failure.

SUMMARY OF THE INVENTION

In accordance with one aspect of the instant invention steel ligatures, such steel strapping or wire, are provided which have coated thereon a thin film of a resinous composition containing a high loading of zinc particles (at least about 80% by weight) and comprising a mixture of from about 8 to 65 weight percent of a phenolformaldehyde resin and from about 35 to 92 weight percent of an epoxy resin and particularly a low molecular weight reaction product of epichlorohydrin and bisphenol A.

The resin mixture is unique in that neither the phenolic resin, by itself, nor the epoxy resin, by itself, will product a satisfactory coating when heavily loaded with zinc dust, the phenolic being too brittle for satisfactory adhesion on a flexible ligature and the epoxy providing poor corrosion resistance. Furthermore, the substitution of a urea-formaldehyde resin or a melamine-formaldehyde resin for the phenol-formaldehyde resin does not provide a coating with equivalent resistance to corrosion.

The method of this invention involves the application of a zinc dust-containing solution of the resin composition in an organic solvent to the surface of the ligature as a thin film followed by heating to drive off the solvent. Further heating to cure the resin composition may be employed, if desired, but is not essential.

Suitable coatings in accordance with this invention require an extremely finely divided zinc dust having an average particle size of 10 microns, or less, and preferably less than 5 microns. In the coatings, zinc dust comprises from about 80 to about 96 weight percent of the coating, the remainder being binder. Zinc dust in concentrations below about 80 weight percent are so encased in the resinous binder that they are unable to provide any appreciable galvanic effect. Coatings having zinc dust in concentrations above about 96 weight percent have so little binder that they lack the necessary toughness to survive as a protective coating in normal ligature usage. The preferred concentration of zinc dust in the coatings is from about 83 to about 95 weight percent.

The phenolic resin used in the binder composition is an alkali-catalyzed phenol-formaldehyde condensation product of low molecular weight and preferably having an average molecular weight in the range of about 800 to about 2000. It is an A-stage product (as described at pages 117–8 in "The Chemistry of Commercial plastics" by Reginald L. Wakeman - Reinhold Publishing Corp., 1947) which is soluble in alcohols and ketones.

As stated above, the binder composition may contain as little as 8 weight percent or as much as 65 weight percent of the phenolic resin. However, for optimum results the concentration of the phenolic resin should be in the range of from about 30 to about 40 weight percent of the binder composition.

The epoxy resin component is preferably a condensation product of epichlorohydrin and bisphenol A having an average molecular weight in the range of about 1200 to about 5000 and most preferably in the range of about 1500 to about 2700.

The resinous components of the binder composition are intimately blended by solution in a suitable solvent. HIgh boiling solvents and solvent systems are preferred, the preferred solvents being cellosolve acetate, carbitol and mixtures thereof. Ketones, such as methyl ethyl ketone and methyl isobutyl ketone are also suitable solvents, but their use involves a flammability hazard.

The coating composition used in this invention is generally applied to the surface of the ligature in a concentration of about 60 to 80 weight percent of solids and about 20 to 40 weight percent of solvent. Preferably the percentage of solvent is from about 22 to about 30 weight percent. The coating composition may be applied by brushing or spraying but is preferably applied by passing the ligature through a reservoir containing the coating composition and then wiping off the excess liquid. The coating composition is generally applied to the ligature in thicknesses from about 0.6 to about 1.2 mils to produce a final coating after solidification from about 0.3 to about 0.6 mils.

After application of the coating composition the ligature is passed through one or more ovens for heating to drive off the solvent and, if desired, to cure the resins. Passage of the ligature through the oven or ovens is preferably in a vertical direction to avoid the possibility of producing an uneven coating due to sag of the coating composition by gravitational effect before solidification.

The heating of the ligature coated with the liquid coating composition drives off the solvent and effects at least a partial cure of the resinous composition. It is a distinctive feature of this invention, however, that satisfactory coatings are produced even under mild heating conditions under which curing is so minimal that the coatings are soluble in solvent systems similar to those from which the coatings are formed. Satisfactory coatings have been produced, for example, at temperatures as low as 300°F. and at heating times at such low temperatures as low as 20 seconds.

When a fully cured coating is desired which is insoluble in solvents, heating at higher temperatures, of the order of 600°F. to 800°F. are employed. Heating times at such higher temperatures may be as low as 15 seconds but may, if desired, be extended to 90 seconds, or more.

EXAMPLES 1 TO 30

To determine the effect of different levels of phenolic resin and the effect of different curing temperatures and times on the resistance of coated steel strapping to salt spray exposure, a series of tests were run. In each of the tests the predominant resinous component in the coating composition was a condensation product of epichlorohydrin and bisphenol A having an average molecular weight in the range of 2000 to 2700. The coating compositions comprised 86 weight percent of zinc dust and 14 weight percent of the resinous binder composition. It was applied to short lengths of steel strapping ½ inch wide × 0.020 inches thick in amounts sufficient to produce a coating of about 0.4 mil thickness. On each sample an "X" mark was scratched through the coating to the bare metal with a carbide scribe. Resistance to rusting at the "X" mark was an indication of galvanic protection by the zinc since the purely mechanical protection of an organic coating seal does not protect underlying steel against corrosion once the seal is broken by a scratch.

In Examples 1 to 3, the binder consisted of 100% of epoxy resin and no phenolic resin; in Examples 4 to 12, the binder consisted of 92% of epoxy resin and 8% of phenolic resin having a molecular weight in the range of 800 to 1200; in Examples 13 to 21, the binder consisted of 83% of epoxy resin and 17% of the same phenolic resin; and in Examples 22 to 30, the binder consisted of 65% of epoxy resin and 35% of the same phenolic resin.

TABLE I

| Example No. | Curing Temp./Curing Time | Rust After Salt Fog—48 hrs. | Rust After Salt Fog—100 hrs. |
|---|---|---|---|
| 1 | 400/30 | at X & surface spots | at X & much at surface |
| 2 | 400/45 | at X | at X & much at surface |
| 3 | 400/60 | partial at X | at X & much at surface |
| 4 | 400/30 | partial at X | at X & surface spots |
| 5 | 400/45 | at X | at X & substantial over surface |
| 6 | 400/60 | partial at X | at X & substantial over surface |
| 7 | 700/20 | partial at X | at X & substantial over surface |
| 8 | 700/25 | none | at X & fine over surface |
| 9 | 700/30 | none | at X & fine over surface |
| 10 | 700/40 | none | partial at X & spots one side |
| 11 | 700/50 | none | trace |
| 12 | 700/60 | none | trace |
| 13 | 400/30 | none | none at X but spots edge and back surface |
| 14 | 400/45 | trace | at X & substantial at edge |
| 15 | 400/60 | none | at X & surface spots |
| 16 | 700/20 | partial at X & surface spots | at X & surface spots |
| 17 | 700/25 | none | many small surface spots |
| 18 | 700/30 | partial at X | substantial at X & small spots on surface |
| 19 | 700/40 | none | small spots |
| 20 | 700/50 | none | trace spots |
| 21 | 700/60 | none | many small spots |
| 22 | 400/30 | substantial at edge & back | at edge & substantial on back |
| 23 | 400/45 | none | many tiny spots |
| 24 | 400/60 | none | trace tiny spots |
| 25 | 700/20 | none | trace tiny spots |
| 26 | 700/25 | none | trace spots at edge |
| 27 | 700/30 | none | trace spots at edge |
| 28 | 700/40 | substantial at X & bend | at X and bend |
| 29 | 700/50 | substantial at X | at X—many tiny surface spots |
| 30 | 700/60 | none | trace at bend edge spots |

TABLE I-continued

| Example No. | Curing Temp./Curing Time | Rust After Salt Fog—48 hrs. | Rust After Salt Fog—100 hrs. |
|---|---|---|---|
| | | | on back side |

EXAMPLES 31 TO 39

A series of steel strapping samples were coated with a coating composition comprising 86 weight percent of zinc dust and 14 weight percent of a binder comprising 35 weight percent of phenolic resin and 65 weight percent of a condensation product of epichlorohydrin and bisphenol A having an average molecular weight of 1500 to 2000. The coatings were generally similar to those described in connection with Example 1 to 30. The heating temperatures (°F.), times (seconds), and the salt spray test results were as follows:

TABLE II

| Example No. | Curing Temp./Curing Time | Rust After Salt Fog—48 hrs. | Rust After Salt Fog—100 hrs. |
|---|---|---|---|
| 31 | 400/30 | partial at X | at X & fine surface spots |
| 32 | 400/45 | partial at X | at X & fine surface spots |
| 33 | 400/60 | none | at X & fine surface spots |
| 34 | 700/20 | none | substantial fine spots |
| 35 | 700/25 | none | many fine surface spots |
| 36 | 700/30 | none | many fine surface spots |
| 37 | 700/40 | none | trace |
| 38 | 700/50 | none | trace |
| 39 | 700/60 | none | trace |

EXAMPLES 40 TO 49

Another series of steel strapping samples were coated with the coating composition of Examples 31 to 39. The heating temperatures (°F.), times (seconds), and the salt spray test results were as follows:

TABLE III

| Example No. | Curing Temp./Curing Time | Rust After Salt Fog—48 hrs. | Rust After Salt Fog—100 hrs. |
|---|---|---|---|
| 40 | 300/20 | none | none |
| 41 | 300/30 | none | none |
| 42 | 300/45 | none | trace at X |
| 43 | 300/60 | none | partial at X |
| 44 | 300/90 | none | none—trace of stain |
| 45 | 400/15 | trace | some at X |
| 46 | 400/20 | none | none |
| 47 | 400/30 | none | none |
| 48 | 400/45 | none | none |
| 49 | 400/60 | none | none |

EXAMPLES 50 TO 53

For comparison purposes another series of steel strapping samples were coated with a coating composition comprising as the resinous ingredient a mixture of 15 weight percent of a melamine-formaldehyde condensation product and 85 weight percent of the low molecular weight epoxy resin of Examples 1 to 30. The heating temperatures (°F.), times (seconds), and the salt spray test results were as follows:

TABLE IV

| Example No. | Curing Temp./Curing Time | Rust After Salt Fog—48 hrs. |
|---|---|---|
| 50 | 700/15 | at X, some stain near X, bend, surface & edges good |
| 51 | 700/20 | at X, some stain near X, bend, surface & edges good |
| 52 | 700/30 | partial at X, some stain near X, bend, surface & edges good |
| 53 | 700/40 | partial at X, some stain next X, bend, surface & edges good |

EXAMPLES 54 TO 56

For comparison purposes another series of steel strapping samples were coated with a coating composition comprising as the resinous ingredient a mixture of 79 weight percent of the low molecular weight epoxy resin of Examples 31 to 39 and 21 weight percent of a flexible ureaformaldehyde condensation product. The heating temperatures (F°.), times (seconds), and the salt spray test results were as follows:

TABLE V

| Example No. | Curing Temp./Curing Time | Rust After Salt Fog—100 hrs. |
|---|---|---|
| 54 | 700/25 | badly rusted |
| 55 | 700/35 | badly rusted |
| 56 | 700/45 | badly rusted |

This invention has been described with respect to a specific embodiment thereof, however, it will be apparent to those skilled in the art that numerous modifications and variations may be effected without departing from the spirit and scope of this invention.

What is claimed is:

1. A steel ligature having adherently coated thereon a thin and flexible film comprising from about 80 to about 96 weight percent of finely divided zinc particles and 4 to 20 weight percent of a binder material, said binder material comprising from about 8 to about 65 weight percent of a phenol-formaldehyde resin and from about 35 to about 92 weight percent of a low molecular weight epoxy resin.

2. The ligature of claim 1 wherein said phenol-formaldehyde resin is a phenol-formaldehyde condensation product having an average molecular weight in the range between about 800 and about 2000.

3. The ligature of claim 1 wherein said epoxy resin is a condensation product of epichlorohydrin and bisphenol A having an average molecular weight in the range between about 1200 and about 5000.

4. The ligature of claim 1 wherein said coating has a thickness between about 0.3 and about 0.6 mils.

5. The ligature of claim 1 wherein said finely divided zinc particles have an average particle size no greater than 10 microns.

6. A steel strapping having adherently coated thereon a flexible film having a thickness between about 0.3 and 0.6 mils and comprising from about 83 to about 95 weight percent of finely divided zinc particles having an average particle size no greater than about 4 microns and about 5 to about 17 parts by weight of a binder material, said binder material comprising from about 30 to about 40 weight percent of a phenol-formaldehyde condensation product having an average molecular weight in the range of about 800 to about 2000 and about 60 to about 70 weight percent of a condensation product of epichlorohydrin and bisphenol A having average molecular weight in the range between about 1200 and about 5000.

7. A method of making a corrosion resistant steel ligature which comprises applying to a steel ligature a liquid composition containg from about 20 to about 40 weight percent of solvents and 80 to about 60 weight percent of solids, said solid comprising from about 80 to about 96 weight percent of finely divided zinc particles and from about 4 to about 20 weight percent by a binder material comprising from about 8 to about 65 weight percent of phenol-formaldehyde resin and from about 35 to about 92 weight percent of a low molecular weight of epoxy resin, and thereafter heating said coated ligature to at least drive off said solvent and leave a solid coherent coating on said ligature.

8. The method of claim 7 wherein said heating is at a temperature and for a time such that said binder material remains soluble in said solvent.

9. The method of claim 7 wherein said heating is at a temperature and for a time such that said binder material becomes insoluble in said solvent.

10. The method of claim 8 wherein said heating is at a temperature from about 300° to about 400° F.

11. The method of claim 9 wherein said heating is at a temperature of about 700° F.

* * * * *